US012784392B2

(12) United States Patent
Kronhav et al.

(10) Patent No.: US 12,784,392 B2
(45) Date of Patent: Nov. 3, 2026

(54) SYSTEM AND METHOD FOR STABILIZING BOUNDING BOXES FOR OBJECTS IN A VIDEO STREAM

(71) Applicant: Axis AB, Lund (SE)

(72) Inventors: Joakim Kronhav, Lund (SE); Martin Kruszynski, Lund (SE); Daniel Andersson, Lund (SE); Emma Persson, Lund (SE)

(73) Assignee: Axis AB, Lund (SE)

( * ) Notice: Subject to any disclaimer, the term of this patent is extended or adjusted under 35 U.S.C. 154(b) by 232 days.

(21) Appl. No.: 18/653,184

(22) Filed: May 2, 2024

(65) Prior Publication Data

US 2024/0378842 A1 Nov. 14, 2024

(30) Foreign Application Priority Data

May 8, 2023 (EP) .................................... 23172013

(51) Int. Cl.

| | |
|---|---|
| ***G06V 10/25*** | (2022.01) |
| ***G06T 5/20*** | (2006.01) |
| ***G06T 5/50*** | (2006.01) |
| ***G06T 5/70*** | (2024.01) |
| ***G06V 10/44*** | (2022.01) |

(52) U.S. Cl.

CPC ................ *G06V 10/25* (2022.01); *G06T 5/20* (2013.01); *G06T 5/50* (2013.01); *G06T 5/70* (2024.01); *G06V 10/44* (2022.01); *G06T 2207/20084* (2013.01); *G06T 2207/20221* (2013.01); *G06V 2201/07* (2022.01)

(58) Field of Classification Search

CPC .... G06V 10/25; G06V 10/44; G06V 2201/07; G06T 5/20; G06T 5/50; G06T 5/70; G06T 2207/20084; G06T 2207/20221; G06T 7/277; G06T 2207/10016; G06T 2207/20182; G06T 7/0002; H04N 21/23418; H04N 21/44008; H04N 25/627; H04N 25/67

USPC .......................................................... 382/103

See application file for complete search history.

(56) References Cited

U.S. PATENT DOCUMENTS

| | | | |
|---|---|---|---|
| 6,297,825 | B1 | 10/2001 | Madden et al. |
| 7,970,229 | B2 | 6/2011 | Connell |
| 8,355,079 | B2 | 1/2013 | Zhang et al. |
| 8,472,714 | B2 | 6/2013 | Brogren et al. |

(Continued)

OTHER PUBLICATIONS

Kumar, S., et al., "Video object extraction and its tracking using background subtraction in complex environments", Perspectives in Science, (2016), https://doi.org/10.1016/j.pisc.2016.04.064.

Shah, R.A., et al., "Improving Performance of CNN Based Vehicle Detection and Tracking by Median Algorithm", IEEE International Conference on Consumer Electronics—Asia, Korea, (2021).

(Continued)

*Primary Examiner* — Jennifer Mehmood
*Assistant Examiner* — Heath E. Wells
(74) *Attorney, Agent, or Firm* — Volpe Koenig

(57) ABSTRACT

A method of stabilizing bounding boxes for objects in a video stream includes receiving a video stream having a sequence of image frames, detecting an object in the image frames and generating a bounding box surrounding the object, measuring a noise level for the video stream, and temporally filtering the bounding box over a plurality of image frames based on the measured noise level, thereby stabilizing the bounding box in the video stream. An image processing system is also disclosed.

13 Claims, 3 Drawing Sheets

(56) References Cited

U.S. PATENT DOCUMENTS

| | | | | |
|---|---|---|---|---|
| 10,511,846 | B1 * | 12/2019 | Chen | H04N 19/137 |
| 2005/0135698 | A1 * | 6/2005 | Yatsenko | G06T 5/20 382/260 |
| 2009/0167951 | A1 * | 7/2009 | Chiu | H04N 19/117 348/607 |
| 2015/0178943 | A1 | 6/2015 | Li et al. | |
| 2017/0262996 | A1 | 9/2017 | Jain et al. | |
| 2018/0046877 | A1 | 2/2018 | Chen et al. | |
| 2019/0065908 | A1 | 2/2019 | Lee et al. | |
| 2019/0130191 | A1 | 5/2019 | Zhou et al. | |
| 2019/0167951 | A1 * | 6/2019 | Harding | A61M 25/065 |
| 2024/0185390 | A1 * | 6/2024 | Jiang | G06T 5/73 |
| 2024/0193789 | A1 * | 6/2024 | Bandwar | G06T 1/20 |

OTHER PUBLICATIONS

Mola, P., et al., "Rapid object detection using a boosted cascade of simple features," Proceedings of the 2001 IEEE Computer Society Conference on Computer Vision and Pattern Recognition, USA, (2001).

Turk, M. A., et al., "Face recognition using eigenfaces," Proceedings of the 1991 IEEE Computer Society Conference on Computer Vision and Pattern Recognition, USA, (1991).

Lee, L., et al. "Gait analysis for recognition and classification," Proceedings of Fifth IEEE International Conference on Automatic Face Gesture Recognition, Washington, DC, USA, (2002).

Novelty Search, UppdragsHuset (2023).

Extended European Search Report issued on Oct. 30, 2023 for European Patent Application No. 23172013.7.

* cited by examiner

SYSTEM AND METHOD FOR STABILIZING BOUNDING BOXES FOR OBJECTS IN A VIDEO STREAM

FIELD OF INVENTION

The present disclosure relates to a method of stabilizing bounding boxes for objects in a video stream. By using the method the user experience with respect to the stability of bounding boxes is improved. The disclosure further relates to an image processing system, which implements the method.

TECHNICAL BACKGROUND

A bounding box is a type of annotation that refers to a box drawn around an object in an image or video. The bounding box is usually, but not necessarily, a rectangle defined by x (longitudinal) and y (latitude) coordinates, whose edges surround the object. A bounding box is not strictly limited to the shape of a rectangle, but may take any suitable shape. The dimensions of the bounding box usually depend on the height and width of the object. Bounding boxes are often labeled with the name of the type of object that they surround, for example, 'CAR' for a bounding box surrounding a car. It is also common that different colors are used for different types of objects.

A machine learning model can be trained to perform object detection and recognize certain object types. In a video stream, which comprises a sequence of image frames, the bounding boxes can either be updated for each image frame or, for example, updated for every N:th image frame. In, for example, a surveillance system comprising a camera, the bounding boxes in the video stream can be updated in substantially real-time such that the user can keep track of a number of objects. If new objects enter the view of the camera or if objects leave the view, the bounding boxes are updated accordingly.

An issue with the existing systems and the existing methods of generating bounding boxes in video streams is that they do not generate stable bounding boxes for objects in the video stream. Although not always visible for the human eye, the video stream will typically have pixel variations between the image frames. These variations make the system compute the bounding boxes slightly different from frame to frame, such that the position and/or size of the bounding box changes between the frames. This may be perceived as a flickering effect on the bounding boxes to the user. This undesired effect can be unpleasant for the user or can provide an experience to the user that the application does not work correctly.

An article, "Video object extraction and its tracking using background subtraction in complex environments", Kumar et al, 2016, doi.org/10.1016/j.pisc.2016.04.064, discloses a method of studying moving blobs on foreground and updating the background to improve tracking accuracy.

Another article, "Improving Performance of CNN Based Vehicle Detection and Tracking by Median Algorithm", Shah et al, 2021, DOI: 10.1109/ICCE-Asia53811.2021.9641942 proposes a median based label estimation scheme that predicts detection labels for objects in a frame using a median of history labels stored in the previous frames.

U.S. Pat. No. 10,511,846 discloses a method and apparatus for adaptive denoising of source video in a video conference application. Temporal denoising is adaptively applied to blocks of a source frame based on noise estimation and moving object detection.

SUMMARY

The present disclosure relates to a method of stabilizing bounding boxes for objects in a video stream, the method comprising:

- receiving a video stream comprising a sequence of image frames;
- detecting an object in the image frames and generating a bounding box surrounding the object;
- measuring a noise level for the video stream; and
- temporally filtering the bounding box over a plurality of image frames based on the measured noise level, thereby stabilizing the bounding box in the video stream
- wherein the bounding box is temporally filtered over a number of preceding image frames
- characterized in that
- the number of preceding image frames is adapted such that a higher noise level implies a temporal filtering over a greater number of preceding image frames and a lower noise level implies a temporal filtering over a smaller number of preceding image frames.

The inventors have realized that the measured noise level can be used to adapt the temporal filtering to achieve a positive, stabilizing effect on the bounding box in the video stream. This may be done by averaging a position of the bounding box in a given image over a number of preceding image frames. The preceding frames can be expressed as a number of frames or as a time window. The number of preceding frames, or the length of the time window, can be adapted to the level of noise. According to one embodiment the number of preceding image frames is adapted such that a higher noise level implies a temporal filtering over a greater number of preceding image frames, or a longer time window, and a lower noise level implies a temporal filtering over a smaller number of preceding image frames, or a shorter time window.

The noise in a video is typically not fixed but varies over time and depends on the environment. When suppressing instability by averaging the position of the bounding box, the inventors have found it to be beneficial to update the length of the time window accordingly. A video that has a high level of noise is prone to produce very unstable bounding boxes, whereas a low level of noise is prone to produce less unstable bounding boxes. By dynamically and continuously updating the time window or the number of preceding frames used in the temporal filtering, it is possible to make the bounding boxes more stable while keeping them as responsive as possible in terms of how fast they react to, for example, movement.

Averaging is, generally, a stabilization technique that would be known to a person skilled in the art. Averaging over a very long time window is, however, not always useful since it creates latency. In other words, what a user or application gains in stability of bounding boxes in a noisy video, the user or application may at the same time lose in latency. A bounding box that has too much latency may be as unpleasant for the user as flickering effects on the bounding boxes caused by noise. The presently disclosed method describes a method and a system that can adapt the stabilization based on the noise level, wherein latency is reduced for less noisy video sequences and wherein slightly increased latency may be tolerated for video sequences having higher noise level as a result of increasing the stability of the bounding boxes.

The present disclosure further relates to an image processing system comprising:

at least one camera; and a processing unit configured to:

receive a video stream comprising a sequence of image frames from the camera;

detect an object in the image frames and generate a bounding box surrounding the object; and measure a noise level for the video stream;

temporally filter the bounding box over a plurality of image frames based on the measured noise level to stabilize the bounding box in the video stream wherein the processing unit is configured to temporally filter the bounding box over a number of preceding image frames characterized in that the number of preceding image frames is adapted such that a higher noise level implies a temporal filtering over a greater number of preceding image frames and a lower noise level implies a temporal filtering over a smaller number of preceding image frames.

The system may further comprise a display for displaying the video stream and the stabilized bounding box. The image processing system may be used in, for example, a camera-based surveillance system.

A person skilled in the art will recognize that the presently disclosed method of stabilizing bounding boxes for objects in a video stream may be performed using any embodiment of the presently disclosed image processing system, and vice versa.

BRIEF DESCRIPTION OF DRAWINGS

Various embodiments are described hereinafter with reference to the drawings. The drawings are examples of embodiments and are intended to illustrate some of the features of the presently disclosed method and system for stabilizing bounding boxes for objects in a video stream, and are not limiting to the presently disclosed method and system.

DETAILED DESCRIPTION

Figure 1:
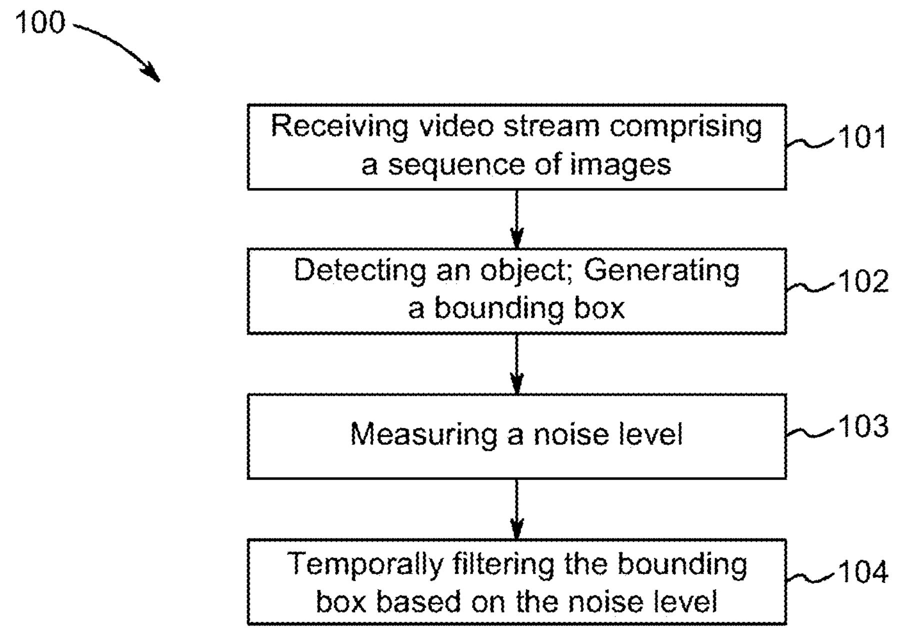
FIG. 1. shows a flow chart of a method according to an embodiment of the presently disclosed method of stabilizing bounding boxes for objects in a video stream.

The present disclosure relates to a method of stabilizing bounding boxes for objects in a video stream. FIG. 1. shows a flow chart of a method according to an embodiment of the presently disclosed method 100 of stabilizing bounding boxes for objects in a video stream. The method 100 comprises the steps of:

receiving a video stream comprising a sequence of image frames (101);

detecting an object in the image frames and generating a bounding box surrounding the object (102);

measuring a noise level for the video stream (103); and temporally filtering the bounding box over a plurality of image frames based on the measured noise level, thereby stabilizing the bounding box in the video stream (104).

The step of temporally filtering the bounding box over a plurality of image frames based on the measured noise level may be done such that a position of the temporally filtered bounding box in a given image frame is a combination, such as an average, of positions of the bounding box for a number of preceding image frames.

Figure 3:
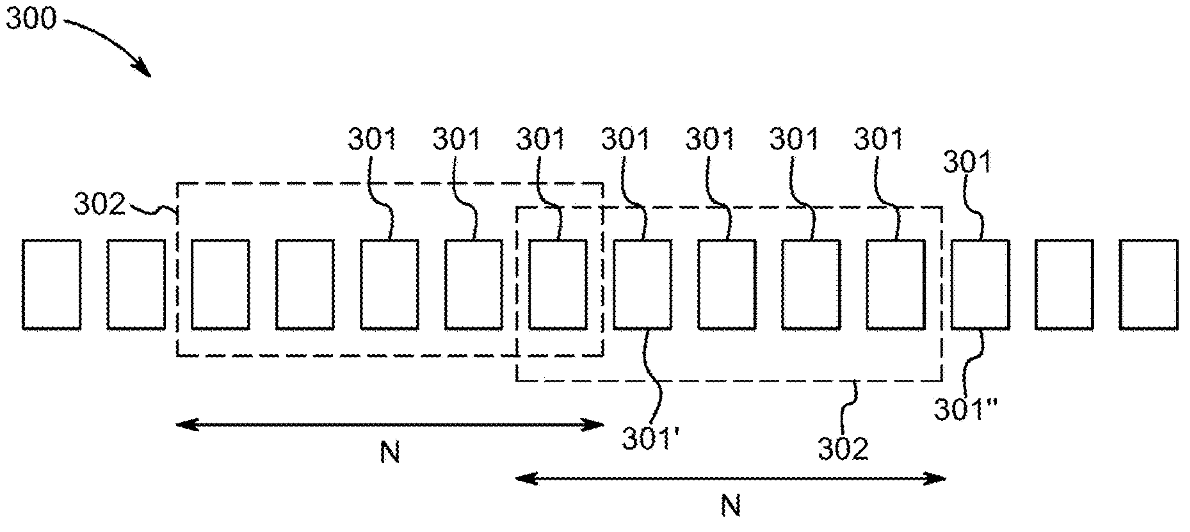
FIG. 3 shows a conceptual illustration of an embodiment of temporally filtering a bounding box over a plurality of image frames based on a measured noise level to stabilize the bounding box.

FIG. 3 shows a conceptual illustration of an embodiment of temporally filtering a bounding box over a plurality of image frames based on a measured noise level to stabilize the bounding box. In the example of FIG. 3 a video 300 comprises a sequence of image frames 301. For a specific given image frame 301', the temporal filtering of a bounding box in the image frame 301' is based on a number of preceding image frames. In the example the number of preceding image frames 302 is 5. The number N in FIG. 3 indicates that the number of preceding image frames 302 is not a fixed number, but a number that can be adjusted based on the noise level. For example, if the noise level increases, the number of preceding image frames 302 based on which the temporal filtering the bounding box is done can be increased from 5 to 6, 7, 10 or any other greater number. If the noise level decreases, the number of preceding image frames 302 based on which the temporal filtering the bounding box is done can be decreased from 5 to 1, 2, 3 or 4 preceding image frames. For another given image frame 301", the concept is the same. The temporal filtering of a bounding box in the image frame 301" is based on a number of preceding image frames 302. The preceding frames can be expressed as a number of frames or as a time window. The noise level for any given point in time, or for any given image frame, can be measured backwards in time for a number of frames and/or for a time window. As an example, for a given image frame, the noise level can be given as an average of pixel brightness for a number of previous image frames. The average can then be subtracted from the pixel brightness of the given image frame. As a person skilled in the art would realize, the pixel brightness may, alternatively, or in combination, be, for example, a color intensity. The number of preceding frames, or the length of the time window, can be adapted to the level of noise.

The step of temporally filtering the bounding box over a plurality of image frames may be based on the measured noise level and may be performed for every N:th image frame, where N is an integer greater than 1. Alternatively, the step of temporally filtering the bounding box over a plurality of image frames based on the measured noise level is performed for every image frame. In the example of FIG. 3 there are two image frames 301' and 301" for which bounding boxes are generated.

The step of temporally filtering the bounding box over a plurality of image frames may comprise temporally smoothing the bounding box. Temporal smoothing is a term that would generally be known to a person skilled in the art. It may refer to averaging the bounding box over multiple image frames to create a more stable position and/or size. The temporal filtering can apply a simple technique, such as plain averaging, but may also apply, for example, exponential smoothing and/or Kalman filtering.

Figure 2A:
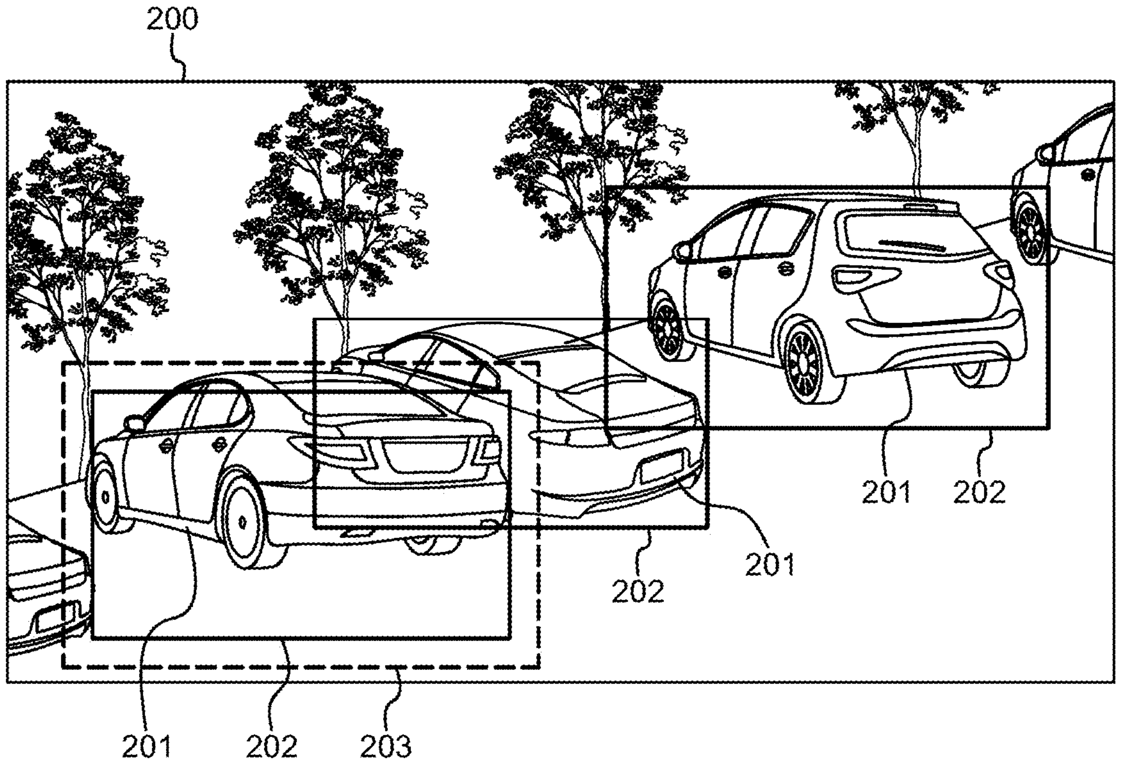
FIGS. 2A-C show an example of a bounding box that is not stable between image frames for a stationary object.
Figure 2B:
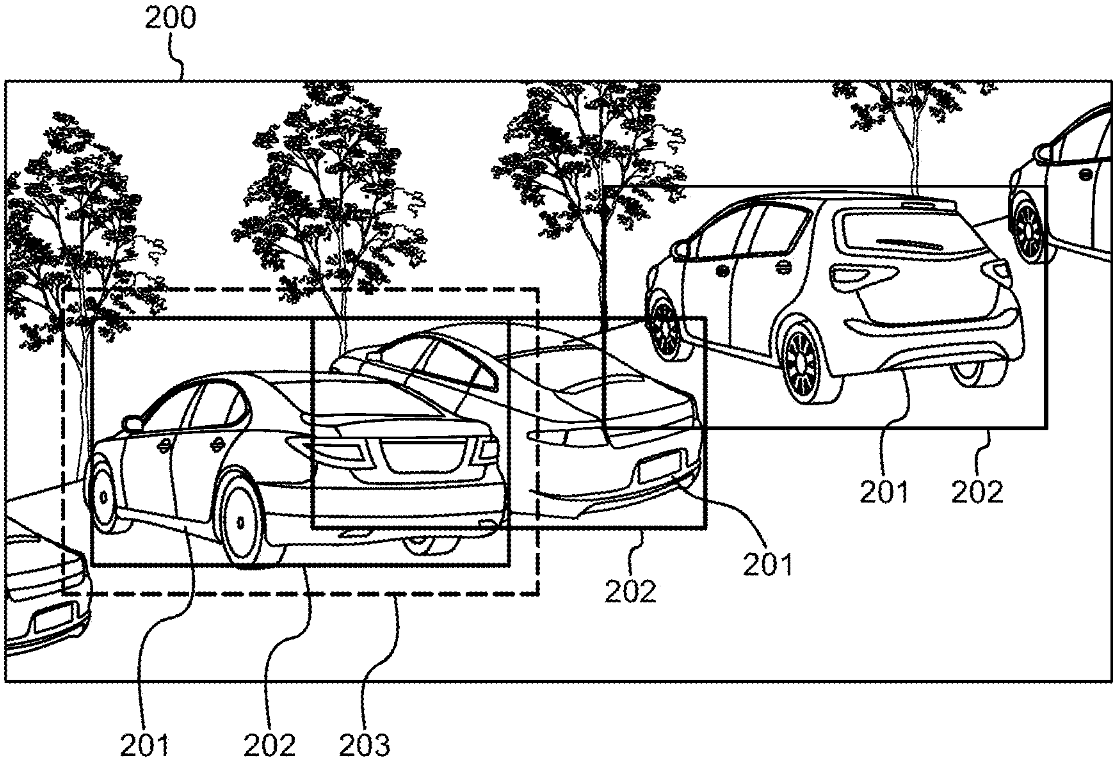
Figure 2C:
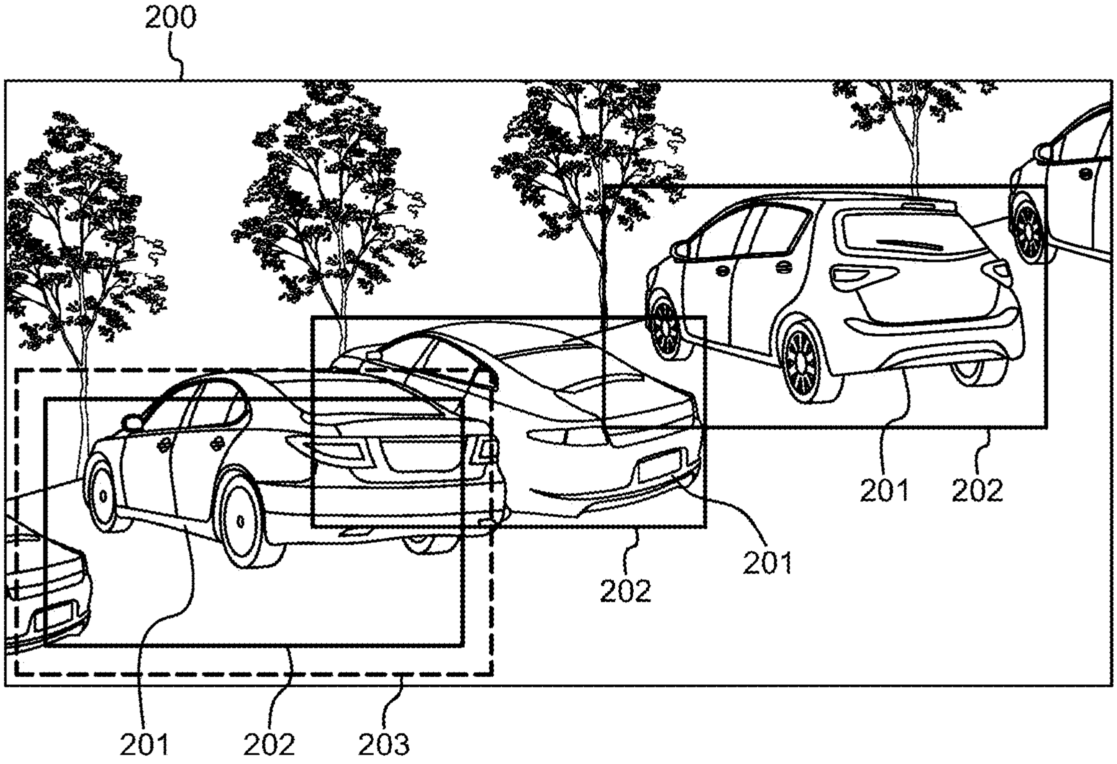

FIGS. 2A-C show an example of a bounding box that is not stable between image frames for a stationary object. In FIG. 2A three stationary objects 201, all cars in this example, have been detected in an image frame 200. For each of the objects 201 a bounding box 202 has been generated. FIGS. 2B and 2C show other image frames of the same scene at a later point in time in the sequence of image frames. Although there is no visible noise in this image sequence it can be noted that the bounding box 202 for the leftmost object 201 does not have the same position in FIGS. 2A, 2B and 2C. Thus, if this sequence of image frames were presented as a video to a user, the user would see the bounding box 202 moving between the image frames. As a simplified example, if the bounding box in FIG. 2C was temporally averaged based on the positions of Figs. A and B, the overall effect would be a more stable bounding box.

If the length of the time window, or the number of preceding image frames based on which the temporal filtering is done, is adapted to a noise level, a more flexible temporal filtering can be achieved.

Noise Level, Measuring a Noise Level

Noise, commonly known as static, white noise, or snow may be a dot pixel pattern that appears in a video. Noise may refer to random variations in brightness or color in the video. It may appear as grainy or speckled texture in the video. In one embodiment the noise is visual noise in the video stream. The noise may be a dot pattern, such as a pixel pattern, varying, such as randomly varying, between the image frames, superimposed on the image frames. Alternatively, or in combination, the noise may comprise fluctuations of color and/or luminance and/or contrast. Video noise may be, but is not necessarily, visible to the user.

Noise can occur due to a number of factors, such as the camera's sensitivity, ISO settings or digital amplification settings. The noise may comprise internal noise, such as noise caused by electricity, heat or illumination levels, and/or compression artifacts, and/or interference noise, such as Gaussian noise and/or fixed-pattern noise and/or salt and pepper noise and/or shot noise and/or quantization and/or anisotropic noise.

Generally, a person skilled in the art would understand what noise in a video can refer to. The term shall, within the context of the present application, be construed broadly to cover any noise that can cause instability of bounding boxes in the video. It would be clear to a person skilled in that art that when there is noise in a video, the detection of objects, and in the end the computation of bounding boxes, may vary slightly.

The step of measuring a noise level for the video stream can be carried out in several ways. Typically, the noise may be expressed as a magnitude of variation of a dot pattern between the image frames. If there, for example, is a high level of similarity between image frames, not taking into account other events like a moving object, the video can be said to have lower noise than if there is a low level of similarity. The noise level can be said to be a measure of the random variations or distortions present in the video.

One measure that can be used to express a noise level is the Signal-to-Noise Ratio (SNR), which is a measure of the ratio of the useful information in the video compared to the noise. A higher SNR indicates a lower noise level. This may be an average over time or for a number of image frames. The Peak-Signal-to-Noise Ratio (PSNR) is another example of how the noise level can be expressed for a person skilled in art. These and other techniques and standards for determining a noise level of a video would be readily available to a person skilled in the art.

The noise level can be measured for an entire region of the image frames, or for a region covering the bounding box, or for a region covering the bounding box and an additional region surrounding the bounding box. In the example of FIGS. 2A-2C there is a region 203, which is slightly larger than the bounding box. The noise level measurements can be done on local regions like the region 203. It may, for example, be useful to focus on a region inside and close to each specific bounding box. One reason for doing that is that noise level may have local variations in the image frames. If, for example, a region to the lower left of the image frames has more noise, a bounding box in that region may have more instability than a bounding box in another region of the image frames. The presently disclosed method of stabilizing bounding boxes for objects in a video stream may accordingly apply different corrections to individual bounding boxes for individual regions in the video.

Similarly, sub-regions comprising moving objects may be disregarded in the step of measuring the noise level since the moving objects may be seen as pixel changes that are accounted to as noise although the moving objects are not noise in the video.

Object Detection

Object detection is a computer vision technique that involves locating and identifying objects within the image frames. A person skilled in that art would generally be familiar with such techniques and would know how to implement them.

Convolutional Neural Networks (CNN) or other machine learning-based methods have gained popularity as they are typically very accurate and fast, but there are a number of object detection techniques that do not rely on CNN or machine learning.

One example of an object detection algorithm is the Viola-Jones detection framework. In this method the image frames are scanned with a sliding window, where each region is classified as containing or not containing an object. The method uses Haar features and a cascaded classifier to detect objects.

There are various types of such object detection methods known in the art where cascades of identifiers are used to detect objects, e.g. as described in Viola, Paul, and Michael Jones. "Rapid object detection using a boosted cascade of simple features." Computer Vision and Pattern Recognition, 2001. CVPR 2001. Proceedings of the 2001 IEEE Computer Society Conference on. Vol. 1. IEEE, 2001. Since it is the visual features that are important for these algorithms groups of objects that share similar visual features may be detected, examples of such groups are faces, vehicles, humans etc. Any of these methods may be used separately or in combination to detect an object in image data. Several objects may also be detected in the same set of image data.

When an object has been detected, a set of identification characteristics may be created to describe the visual appearance of the detected object. Image data from a single image frame or a video sequence may be used to create the identification characteristics for the detected object. Various image and/or video analysis algorithms may be used to extract and create the identification characteristics from the image data. Examples of such image or video analysis algorithms are various algorithms e.g. for extracting features in a face such in Turk, Matthew A., and Alex P. Pentland. "Face recognition using eigenfaces." Computer Vision and Pattern Recognition, 1991. Proceedings CVPR'91., IEEE Computer Society Conference on. IEEE, 1991., gait features such in Lee, Lily, and W. Eric L. Grimson. "Gait analysis for recognition and classification." Automatic Face and Gesture Recognition, 2002. Proceedings. Fifth IEEE International Conference on. IEEE, 2002., or colors such in U.S. Pat. No. 8,472,714 by Brogren et al.

A database may comprise a number of objects and a number of identification characteristics. In the presently disclosed method of stabilizing bounding boxes for objects in a video stream, the step of detecting an object in the image frames may comprise matching identification characteristics to identification characteristics in the database to classify an object as a certain type of object, for example, a car, a person or any other item. In one embodiment the step of detecting an object in the image frames comprises comparing the image frames against reference images in a database to match features corresponding to the object in the image frames and the reference images.

A Scale-Invariant Feature Transform (SIFT) is another feature-based object detection technique that uses keypoint extraction and matching to detect and track objects in a video. It works by identifying distinctive features in the image, such as edges, corners and blobs, and matching them across multiple frames.

The step of detecting an object in the image frames comprises processing the image frames to identify predefined features, such as shapes, that are characteristic for the object.

As mentioned above, alternatively, or in combination, the step of detecting an object in the image frames may comprise applying a machine learning model, such as a neural network, trained to recognize the object. The neural network may comprise, for example, a deep learning model.

Classification of objects and/or of events may be achieved by means of a neural network. Classifying neural networks are often used in applications like character recognition, monitoring, surveillance, image analysis, natural language processing etc. There are many neural network algorithms/technologies that may be used for classifying objects, e.g. Convolutional Neural Networks, Recurrent Neural Networks, etc.

According to a non-limiting example of a setup for object detection using a neural network, a neural network is fed with labeled data. The labeled data is, for example, an image of an object to be classified, wherein the image is labeled with the correct class, i.e. the labeled data includes a ground truth of the image data and the image data itself. The image data is inputted to the classifier and the ground truth is sent to a loss function calculator. A classifier processes the data representing an object to be classified and generates a classification identifier. The processing in the classifier may include applying weights to values as the data is fed through the classifier. The classification identifier may be a feature vector, a classification vector, or a single value identifying a class. In the loss function the classification identifier is compared to the ground truth using, for example, a loss function. The result from the loss function is then transferred to a weight adjustment function that is configured to adjust the weights used in the classifier. When the classifier is fully trained it may be used to perform a classification by loading the data to be classified into the classifier. The data to be classified may be in the same form as the labeled data used during training, but without the label. The classifier can then output data identifying the class determined for the data inputted.

The present disclosure further relates to an image processing system comprising:

at least one camera; and a processing unit configured to:

receive a video stream comprising a sequence of image frames from the camera;

detect an object in the image frames and generate a bounding box surrounding the object; and measure a noise level for the video stream;

temporally filter the bounding box over a plurality of image frames based on the measured noise level to stabilize the bounding box in the video stream.

Figure 4:
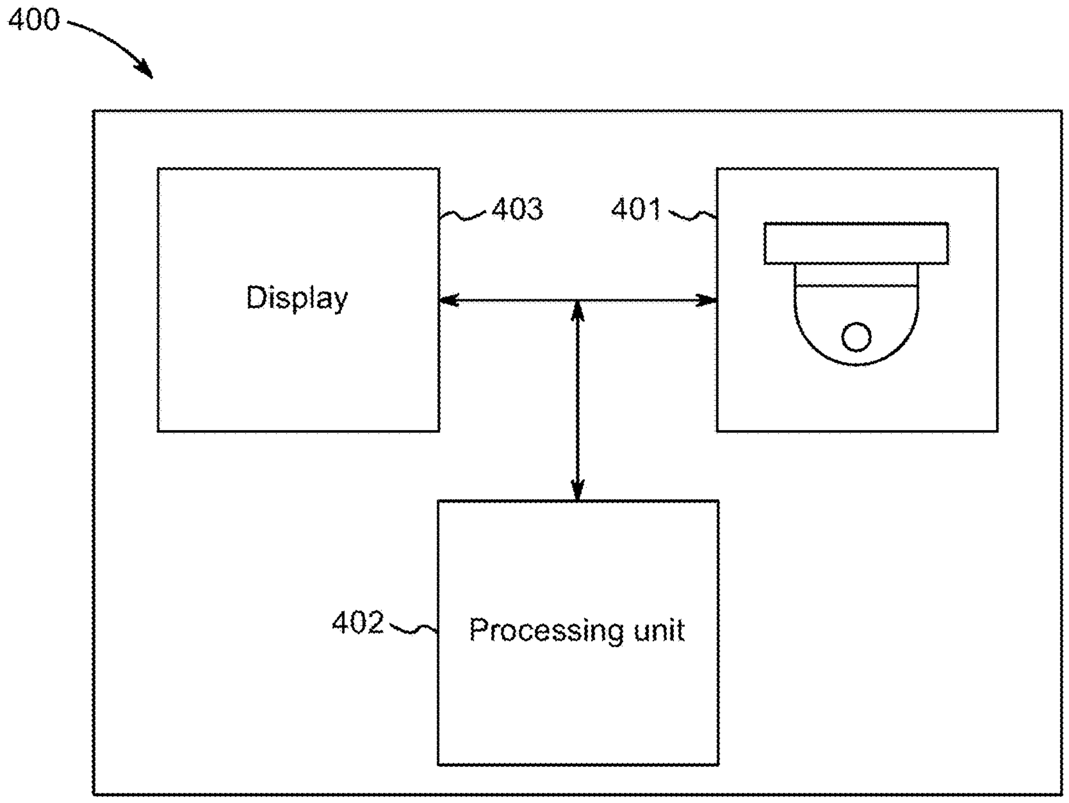
FIG. 4 shows a schematic view of an embodiment of the presently disclosed image processing system.

FIG. 4 shows a schematic view of an embodiment of the presently disclosed image processing system 400. The disclosed image processing system 400 comprises a camera 410, a display 403 and a processing unit 402.

The system may, but does not necessarily have to, include a display for displaying the video stream and stabilized bounding box. The stabilization of bounding boxes for objects in a video stream may be a useful visual feature for a user viewing the display. However, in further applications the bounding boxes are not necessarily displayed but used in additional applications. The additional application may include, for example, extracting statistics or further information from the video, for example, analyzing sizes or orientations of objects. As would be realized by a person skilled in the art, neither the system nor the method have to be limited to displaying the bounding boxes on a display.

The system may further comprise peripheral components, such as one or more memory units, which may be used for storing instructions that can be executed by the processing unit. The system may further comprise any of: internal and external network interfaces, input and/or output ports, a keyboard or mouse etc.

As would be understood by a person skilled in the art, a processing unit also may be a single processor in a multi-core/multiprocessor system. Both the computing hardware accelerator and the central processing unit may be connected to a data communication infrastructure.

The system may include a memory unit, such as a random access memory (RAM) and/or a read-only memory (ROM), or any suitable type of memory. The system may further comprise a communication interface that allows software and/or data to be transferred between the system and external devices. Software and/or data transferred via the communications interface may be in any suitable form of electric, optical or RF signals. The communications interface may comprise, for example, a cable or a wireless interface.

The present disclosure further relates to a computer program having instructions which, when executed by a computing device or computing system, cause the computing device or computing system to carry out any embodiment of the presently disclosed method of stabilizing bounding boxes for objects in a video stream. The computer program may be stored on any suitable type of storage media, such as non-transitory storage media.

The invention claimed is:

1. A method of stabilizing bounding boxes for objects in a video stream, the method comprising:

receiving a video stream comprising a sequence of image frames;

detecting an object in the image frames and generating a bounding box surrounding the object;

measuring a noise level for the video stream, wherein the noise level is measured for an entire region of the image frames, a region covering the bounding box, or a region covering the bounding box and an additional region surrounding the bounding box; and adjusting a position of the bounding box over a plurality of image frames based on the measured noise level, thereby stabilizing the bounding box in the video stream, wherein the position of the bounding box is adjusted over a number of preceding image frames, and the number of preceding image frames is adapted such that a higher noise level implies a greater number of preceding image frames and a lower noise level implies a smaller number of preceding image frames.

2. The method of stabilizing bounding boxes for objects in a video stream according to claim 1, wherein a position of the adjusted bounding box in a given image frame is a combination, such as an average, of positions of the bounding box for a number of preceding image frames.

3. The method of stabilizing bounding boxes for objects in a video stream according to claim 2, comprising the step of adapting the number of preceding image frames to the measured noise level.

4. The method of stabilizing bounding boxes for objects in a video stream according to claim 1, wherein the noise is visual noise in the video stream, the noise is a dot pattern, such as a pixel pattern, varying, such as randomly varying, between the image frames, superimposed on the image frames, or wherein the noise level is a magnitude of variation of a dot pattern between the image frames.

5. The method of stabilizing bounding boxes for objects in a video stream according to claim 1, wherein the noise comprises one or more of fluctuations of color, luminance, or contrast, internal noise, such as noise caused by electricity, heat or illumination levels, compression artifacts, or interference noise, such as Gaussian noise, fixed-pattern noise, salt and pepper noise, shot noise, quantization noise or anisotropic noise.

6. The method of stabilizing bounding boxes for objects in a video stream according to claim 1, wherein a noise level for sub-regions comprising moving objects is disregarded in the step of measuring the noise level.

7. He method of stabilizing bounding boxes for objects in a video stream according to claim 1, wherein the step of adjusting the position of the bounding box over a plurality of image frames based on the measured noise level is performed for every N:th image frame, where N is an integer greater than 1, or wherein the step of adjusting the position of the bounding box over a plurality of image frames based on the measured noise level is performed for every image frame.

8. The method of stabilizing bounding boxes for objects in a video stream according to claim 1, wherein the noise level for any given point in time is measured backwards in time for a number of image frames or for a time window.

9. The method of stabilizing bounding boxes for objects in a video stream according to claim 1, wherein the step of adjusting the position of the bounding box over a plurality of image frames comprises temporally smoothing the bounding box.

10. The method of stabilizing bounding boxes for objects in a video stream according to claim 1, wherein the step of detecting an object in the image frames comprises applying a machine learning model, such as a neural network, trained to recognize the object.

11. The method of stabilizing bounding boxes for objects in a video stream according to claim 1, wherein the step of detecting an object in the image frames comprises processing the image frames to identify predefined features, such as shapes, that are characteristic for the object.

12. Non-transitory computer readable recording medium comprising a computer program having instructions which, when executed by a computing device or computing system, cause the computing device or computing system to carry out a method of stabilizing bounding boxes for objects in a video stream, the method comprising:

receiving a video stream comprising a sequence of image frames;

detecting an object in the image frames and generating a bounding box surrounding the object;

measuring a noise level for the video stream, wherein the noise level is measured for an entire region of the image frames, a region covering the bounding box, or a region covering the bounding box and an additional region surrounding the bounding box; and adjusting a position of the bounding box over a plurality of image frames based on the measured noise level, thereby stabilizing the bounding box in the video stream, wherein the position of the bounding box is adjusted over a number of preceding image frames, and the number of preceding image frames is adapted such that a higher noise level implies a greater number of preceding image frames and a lower noise level implies a smaller number of preceding image frames.

13. N image processing system comprising:

at least one camera; and a processing unit configured to:

receive a video stream comprising a sequence of image frames from the camera;

detect an object in the image frames and generate a bounding box surrounding the object; and measure a noise level for the video stream, wherein the noise level is measured for an entire region of the image frames, a region covering the bounding box, or a region covering the bounding box and an additional region surrounding the bounding box;

adjust a position of the bounding box over a plurality of image frames based on the measured noise level to stabilize the bounding box in the video stream, wherein the processing unit is configured to adjust the position of the bounding box over a number of preceding image frames, characterized in that the number of preceding image frames is adapted such that a higher noise level implies a greater number of preceding image frames and a lower noise level implies a smaller number of preceding image frames.

* * * * *